Dec. 2, 1952          E. C. ELSNER          2,619,698
SAFETY HOOK
Filed May 20, 1950
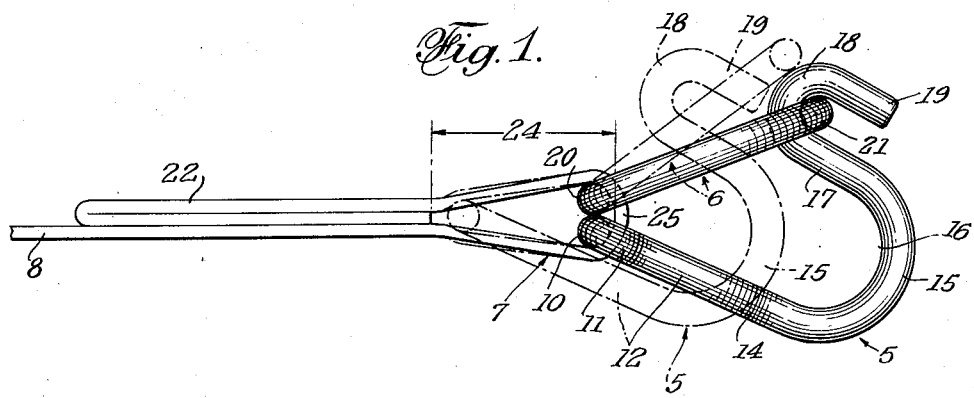
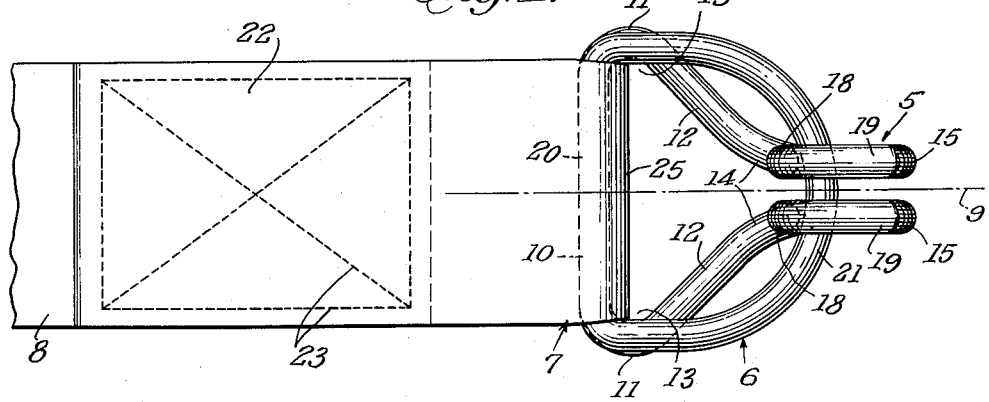
Inventor
EDWIN C. ELSNER
By    C. G. Stratton
Attorney Patented Dec. 2, 1952

2,619,698

UNITED STATES PATENT OFFICE 2,619,698

SAFETY HOOK

Edwin C. Elsner, Glendale, Calif., assignor to C. J. W. Corporation, North Hollywood, Calif., a corporation of California Application May 20, 1950, Serial No. 163,222

1 Claim. (Cl. 24—231)

This invention relates to a hook such as used at the end of a strap or band to effect safe connection of the strap or band to an eye, loop, or the like.

Various types of safety hooks are known, each embodying a hook element that serves as the connecting means, and a guard element that obviates inadvertent release of the hook element. In most of such prior devices, the guard element is carried by the hook element and is slidable thereon to effect release, such structures, therefore, entailing pre-assembly of the two elements and also special design involving relatively high cost. Other prior devices string the hook and guard elements on the eye at the end of a rope or through a thimble lining such an eye, and depend on a rotational movement of the elements in the eye to so position them that they may be separated when desired. Such rotational movement throws the parts laterally with respect to the line of pull of the rope mounting them, a condition that frequently cannot be obtained for lack of space permitting such movement. Moreover, such rotation-permitting engagement of the hook and guard elements is a source of friction that increases wear and, therefore, impairs safety. Also, the pull on the device is often displaced at an angle relative to the pull of the rope and may result in slack that will effect loosening of a crate or unit of cargo intended to be secured.

The present invention contemplates and it is an object thereof to provide a safety hook that is characterized by the simplicity and sturdiness of its construction, and to so form the same that alignment with the line of pull thereon is assured at all times, the elements of the hook being disengageable or separable only by a straight-line movement of one of them relative to the other.

Another object of the invention is to provide a safety hook, as above, that is designed particularly for connection with the end eye of a relatively wide webbing band so that rotation of the hook in the eye is obviated, said eye having a depth of such degree that straight-line displacement of one element of the hook is afforded relative to the other element, whereby separation or disengagement of the elements is readily effected.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a side elevational view of a preferred form of safety hook according to the present invention.

Fig. 2 is a plan view thereof.

The safety hook that is illustrated comprises, generally, a hook element 5, a guard element 6, and an eye 7 on the end of a band of webbing 8 and mounting both elements 5 and 6.

While the hook element 5 may be formed in various ways, the same is formed of a single length of round-sectioned steel rod bent to comprise an element symmetrical on a plane represented by line 9 and extends through the longitudinal center of the band 8. Said element 5 is formed to have a transverse bar portion 10, at the ends of which there are sharply curved arcuate bends 11 that extend through arcs of approximately 135° and terminate in straight portions 12. The latter portions, thereby converge toward each other and include an angle approximating 90°. The portion 10 and the two portions 12 define an isosceles triangle in which portion 10 is the base and the angles 13 included between said base and the portions 12, are acute, being in the nature of 45°.

The converging ends of portions 12 terminate in oppositely curved bends 14 that may, if desired, contact on the plane of line 9 but, as shown, are somewhat separated on each side of said line. The ends of both bends 14 are then formed as parallel curved hook portions 15 that curve through an arc of some 180°, said latter two portions defining a bight 16. The ends of hook portions 15 are extended as parallel portions 17, at the ends of which are formed right angle bends 18 curved reversely to the hook portions 15. The ends of bends 18 are extended to form relatively short terminating portions 19 that are substantially parallel to portions 17.

Thus, it will be seen that the portions 15, 17, 18 and 19, on both sides of the plane of line 9, are parallel; that the portions 12 and 14 constitute the shank of the hook element; that the portions 15 define the bight thereof; that the portions 17 comprise the bill of the hook element; and that bends 18 and portions 19 constitute a guard loop for the guard element 6.

The guard element 6 comprises a conventional D-ring of round-sectioned rod substantially similar to that of element 5. In the usual manner, element 6 comprises a transverse bar part 20 and a curved part 21. In this case, the distance between the middle of part 20 and the farthermost opposite portion of part 21 is made to be substantially the same or slightly less than the direct distance between the middle of part 19 and the guard loop defined by bends 18.

The band 8 comprises any suitable woven or integrally made pliable member. In this case, the width of the band is substantially equal to or slightly greater than the length of parts 10 and 20 so that, normally, the band cannot be made to fit into the triangle defined by parts 10 and 12 of element 5 or within element 6, without some crowding. This obviates end play of the safety hook and maintains the pull thereof on the longitudinal center of the band, and also obviates any tendency for the hook elements 5 and 6 to rotate in the plane of the band or transverse to the plane of line 9.

The eye 7 on the end of the band may be formed in any suitable manner. As shown, after the end 22 of the band is passed through both elements 5 and 6, while one is above the other, said end is doubled back on the band and permanently secured thereto as by stitching 23. While such eye construction is generally conventional, in the present instance the depth thereof, as exemplified by dimension 24, is made to be greater than the distance the element 5 must be moved rearwardly (to the dot-dash line position) to clear the ends of the terminating portions 19 from the curved portion 21 of element 6. However, the dimension 24 is limited to be considerably less than the length of parts 10 and 20 to further obviate any tendency of elements 5 and 6 to become rotationally displaced in eye 7 in the plane of band 8. Said elements, of course, are free to swing in eye 7 around the respective parts 10 and 20 thereof.

The efficacy in use of the present safety hook should be evident. With the hook element 5 retracted to the rear of eye 7 and the guard element disengaged therefrom, as shown by the dot-dash lines of Fig. 1, the bight 16 of element 5 can be engaged with an eye, loop or other connection means. Now, while band 8 is still slack, guard element 6 is swung over the ends of terminating portions 19 and the same comes to rest on portions 17 or on adjacent portions of hook portions 15. Then, as the slack in band 8 is taken up, eye 7, together with element 6, is drawn rearwardly until both bar portions 10 and 20 are engaged with the bight 25 of eye 7, and the curved portion 21 of the guard element 6 is drawn into the guard loop of hook element 5 so that the guard element closes hook 15. It will be clear that it will be impossible to separate the interengaged elements 5 and 6 until sufficient slack has been provided in band 8 to allow forward movement of the eye 7, whereby separation of the elements may be effected.

While the invention that has been illustrated and described is now regarded as the preferred embodiment, the construction is, of course, subject to modifications without departing from the spirit and scope of the invention. It is, therefore, not desired to restrict the invention to the particular form of construction illustrated and described, but to cover all modifications that may fall within the scope of the appended claim.

Having thus described the invention, what is claimed and desired to be secured by Letters Patent is:

A safety hook comprising in combination, a hook element formed from a single length of metal rod stock bent to form a bar portion, from the ends of which extend forwardly and downwardly converging arms, the free ends of the arms being disposed in parallel relation to each other and bent upwardly to form a substantially S-shaped hook portion, a guard element of substantially D-shaped formation for disposition on top of the hook element, a flexible band having an elongated loop formed at one end thereof, said band being of substantially the same width as the length of the bar portion of the hook element and the straight leg portion of the D-shaped guard element, said bar portion and said leg portion extending transversely through the loop, the curved front portion of the D-shaped guard element being removably engaged over the upper portion of the S-shaped hook portion to normally close said hook element, the bar portion of the hook element being adapted for rearward sliding movement in the elongated loop to permit disengagement of the S-shaped hook portion from the curved front portion of the D-shaped guard element.

EDWIN C. ELSNER.

REFERENCES CITED

The following references are of record in the file of this patent:

UNITED STATES PATENTS

| Number | Name | Date |
|---|---|---|
| 63,762 | Starbuck | Apr. 9, 1867 |
| 282,011 | Rudolph | July 24, 1883 |
| 1,839,838 | Fox | July 5, 1932 |

FOREIGN PATENTS

| Number | Country | Date |
|---|---|---|
| 113,779 | Sweden | Apr. 10, 1945 |